United States Patent [19]

Higashi et al.

[11] 4,228,988
[45] Oct. 21, 1980

[54] VALVE

[75] Inventors: Kazo Higashi; Sadayuki Nakanishi, both of Kobe; Akio Fukunaga, Kakogawa, all of Japan

[73] Assignee: Kobe Steel, Limited, Kobe, Japan

[21] Appl. No.: 953,111

[22] Filed: Oct. 20, 1978

[30] Foreign Application Priority Data

Oct. 28, 1977 [JP] Japan .............................. 52-129968

[51] Int. Cl.$^3$ .............................................. F16K 3/00
[52] U.S. Cl. .................................... 251/327; 137/629; 251/DIG. 1
[58] Field of Search ................. 251/DIG. 1, 327, 315; 137/628, 629, 630.12

[56] References Cited

U.S. PATENT DOCUMENTS

| | | | |
|---|---|---|---|
| 2,713,989 | 7/1955 | Bryant | 251/DIG. 1 X |
| 3,047,018 | 7/1962 | Lucien | 251/DIG. 1 X |
| 3,109,623 | 11/1963 | Bryant | 251/327 X |
| 3,667,504 | 6/1972 | Wittren | 251/DIG. 1 X |
| 4,036,469 | 7/1977 | Robinson | 251/315 X |

Primary Examiner—Harold Weakley
Attorney, Agent, or Firm—Oblon, Fisher, Spivak, McClelland & Maier

[57] ABSTRACT

A valve including annular valve seats, made of a resilient material such as rubber, fitted in respective valve seat retainers provided in the peripheral portions of fluid passages in the valve body. A gate is slidingly moved to open or close the valve, with its wall surface being maintained in contact with each valve seat. Each of said annular valve seats are brought into close contact with the wall of the gate when the gate is moved to a closed position to provide sealing therebetween. In addition, the valve comprises a fluid passage provided in the gate which serves to decrease the pressure of the fluid acting on the valve seat on the upstream side at the initial stage of the movement of the gate from the closed position to the open position, whereby the valve seat is biased from the gate.

4 Claims, 9 Drawing Figures

VALVE

BACKGROUND OF THE INVENTION

1. Field of the Invention

This invention relates to a valve, wherein the fluid pressure on the upstream side of the valve seat is decreased when the gate is moved to an open position.

2. Description of the Prior Art

As is well known, a valve, such as a gate valve or a ball valve, includes annular valve seats fitted in valve seat retainers provided in the peripheral portions of fluid passages in the valve body, respectively. A valve seat which is generally made of rubber, bulges out through an opening in the valve seat retainer due to the pressure of the fluid on the upstream side of the valve seat retainer and is thereby forced into close contact with the wall surface of the gate, thus providing the sealing therebetween when the gate is moved to a closed position. The valve is such that in order to shift the valve between the open and closed positions, the gate is continuously slidingly moved, with its wall surface maintained in close contact with the wall of the valve seat, rather than the wall surface of the gate being instantaneously separated from the valve seat. With such a valve, a shortcoming due to structural factors arises when at the initial stage during which time the gate is being moved to an open position, part of the valve seat on the upstream side, which has become disengaged from the wall surface of the gate, is undesirably forced from the opening in the valve seat retainer to project to the exterior thereof. This phenomenon will be described in more detail by the following with reference to FIGS. 1 through 5.

FIG. 1 shows an example of a gate valve. A valve body 1 has horizontal fluid communication holes 2a and 2b running transversely thereof, and a vertical guide passage 4 for a gate 3. Within guide passage 4 is fitted a gate 3, which is adapted to move vertically into open and closed positions by the upward and downward motion of a stem 5 connected to the top of gate 3. Gate 3 is a flat plate having a given thickness as shown in FIG. 2, which has a fluid blocking portion 3a in the upper portion thereof and an opening portion 3b in the lower portion.

In the peripheral portions of fluid communication holes 2a and 2b in valve body 1 are provided seal rings 6a and 6b which slidingly contact the opposite walls of gate 3, respectively. Each seal ring, 6a and 6b, includes a resilient valve seat 7, a valve seat retainer 9 for holding the valve seat, and an annular sealing member 8 provided in the fitting portion between the seat retainer 9 and valve body 1. The diameter of annular sealing member 8 is selected so as to provide the necessary self-tightening force such that each seal ring, 6a and 6b, is brought into close contact with gate 3 by the fluid pressure to provide the sealing therebetween. Seal rings 6a and 6b are usually biased inwardly from the valve body, namely, towards gate 3, under the force of coil springs 10.

Operation of the seal ring will now be described. For explanatory simplicity, the description will be limited to the upstream side (seal ring 6a). When gate 3 assumes the closed position, valve seat 7 is maintained in close contact with valve body 3 by virtue of the self-tightening force by the fluid pressure, thus providing the sealing therebetween.

The opening and closing of gate 3 is achieved by upward and downward motion thereof. When blocking portion 3a of gate 3 faces fluid communication holes 2a and 2b in valve body 1, communication of fluid is interrupted; whereas when opening portion 3b of gate 3 faces fluid communication holes 2a and 2b, fluid is allowed to flow, for example, from fluid communication hole 2a by way of opening portion 3b of gate 3 into fluid communication hole 2b.

Valve seat 7 acts in the manner shown in FIG. 3, which shows gate 3 in the closed position. Fluid within fluid communication hole 2a on the upstream side is introduced, by way of a small gap between seat retainer 9 and blocking portion 3a of gate 3 into a groove 11 in valve seat retainer 9, thereby pressing valve seat 7 fitted in groove 11 under a pressure of $P_1$. Resilient valve seat 7, under fluid pressure from the upstream side, tends to be swelled out from opening 13 of groove 11 in the valve seat retainer 9 into close contact with the wall surface of gate 3 as well as the bottom surface of groove 11. The surface-bearing pressure $P_2$ acting on the face surface of gate 3 is higher than pressure $P_1$ of the fluid, so as to provide perfect sealing therebetween.

When the gate 3 is in the closed position, pressure of the fluid on the upstream side is exerted on valve seat 7, such that a shortcoming arises when gate 3 is moved from the closed position to the open position. Such shortcoming arises upon the displacement of blocking portion 3a of valve body 3 with respect to valve seat 7. Stated otherwise, when gate 3 is moved upward, the relationship of the gate 3 with valve seat 7 as shown in FIG. 4, is established. Thus, when the bottom end of blocking portion 3a of gate 3 is separated from valve seat 7, valve seat 7 in turn intersects the top end of opening portion 3b of gate 3. Valve seat 7 is thus urged toward opening 13 by pressure $P_1$ of the fluid within groove 11 with the result that the valve seat is eventually forced out of the groove 11 in valve seat retainer 9 and forced into opening portion 3b of gate 3, as shown in FIG. 3, thereby impairing the valve function.

The prior art has thereby attempted to solve this problem by such means as: (1) making valve seat 7 of a hard material so as to impart an increased resistance to deformation; and (2) increasing the size of opening 13 of groove 11 in valve seat retainer 9. These means have disadvantages in the former prior art solution, when the working fluid is low in pressure, the valve seat fails to swell so as to closely contact the wall surface of the gate, resulting in the lowered sealing performance, and in the latter prior art solution, reducing the size of the opening limits the extent of valve seat swelling with the result being failure to provide perfect sealing when the working fluid pressure is low. Furthermore, because of the limited tensile strength of resilient materials such valve seats cannot be utilized under high tension.

SUMMARY OF THE INVENTION

It is accordingly the object of the present invention to provide a valve, wherein a fluid passage is provided in the gate itself, so that a valve seat may fulfill its sealing function in either case where the working fluid pressure is high, or where the fluid pressure is low.

To attain these objects, the present invention comprises a valve including annular valve seats made of a resilient material such as rubber, and fitted in respective valve seat retainers located in the peripheral portions of fluid passages provided in a valve body. Each valve seat swells through an opening in each valve seat retainer under the pressure of a fluid on the upstream portion of the valve seat into close contact with the wall surface of a gate when the gate assumes a closed position, thus providing the sealing therebetween. The gate is continuously slidingly moved into a closed or open position, with its wall surface being in close contact with the surface of each valve seat. The aforesaid valve is characterized by a fluid passage provided in the gate. This fluid passage serves to reduce the pressure of the fluid on the upstream side of the valve seat thereby biasing the gate from the valve seat when the gate is initially moved from the closed position to the open position. The aforesaid valve may be either a gate valve or a ball valve.

By such arrangement, when the gate is moved from the closed position to the open position, the fluid pressure on the upstream side which has acted on each valve seat is decreased by means of the fluid passage located in the gate such that there is no possibility of the valve seat being swelled to the extent that it projects through the opening of each valve seat retainer.

The aforesaid fluid passage serves to drain the fluid in the groove in the valve seat retainer to the downstream side. This fluid passage is realized by a fluid communication hole in the gate whose inlet is open to the upstream side and whose outlet is open to the downstream side, or alternatively, by a stepped portion in the gate wall produced by cutting part of the wall of the gate which is near the upstream side.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE PREFERRED EMBODIMENTS

Figure 1:
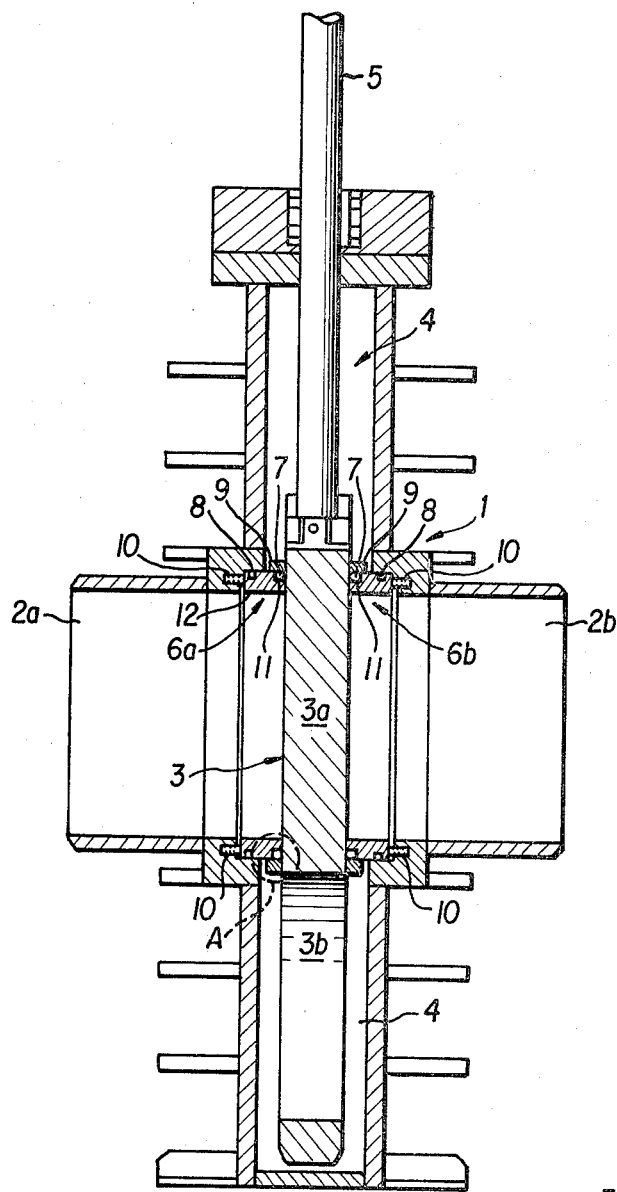
FIG. 1 is a longitudinal cross sectional view of a prior art gate valve shown by way of example.
Figure 2:
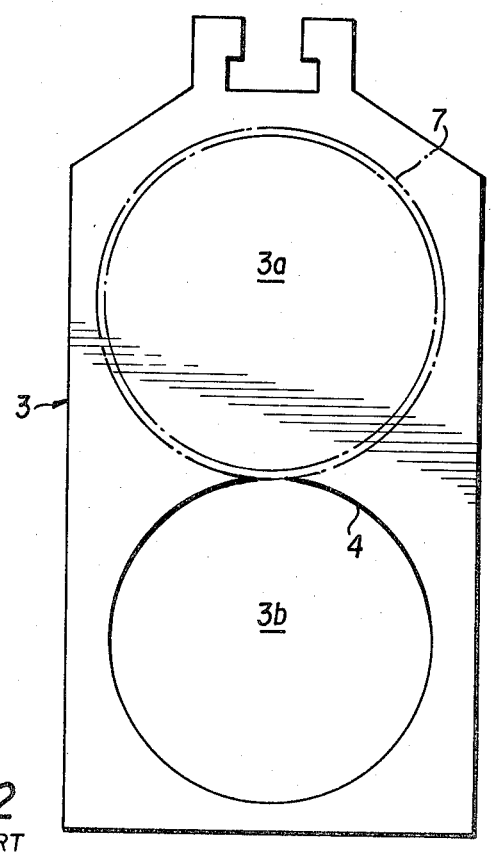
FIG. 2 is a front view of the gate thereof.
Figure 3:
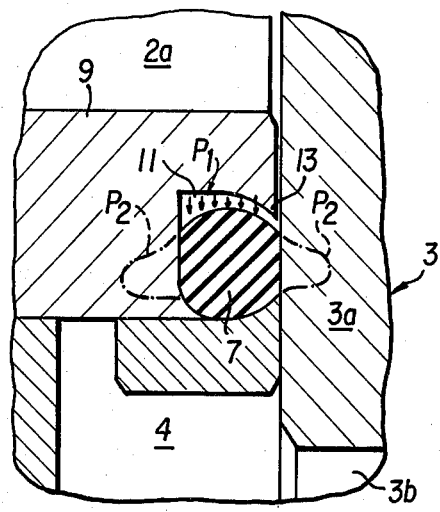
FIGS. 3, 4 and 5 are enlarged cross sectional views of the designated portion A of FIG. 1, respectively.
Figure 4:
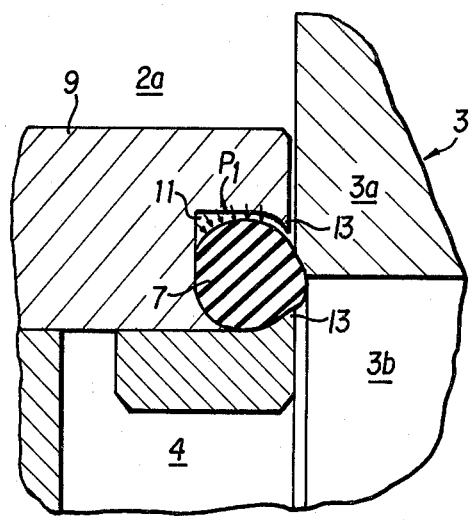
Figure 5:
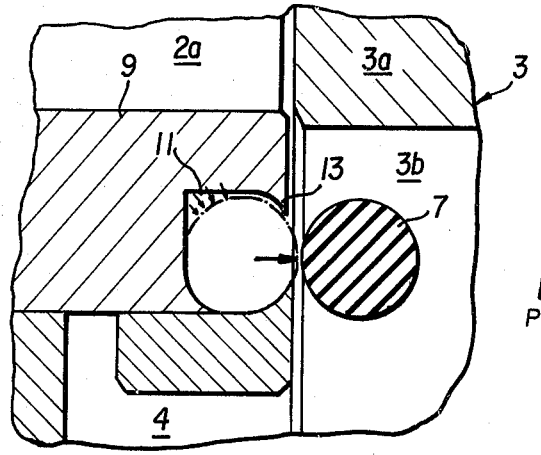
Figure 6:
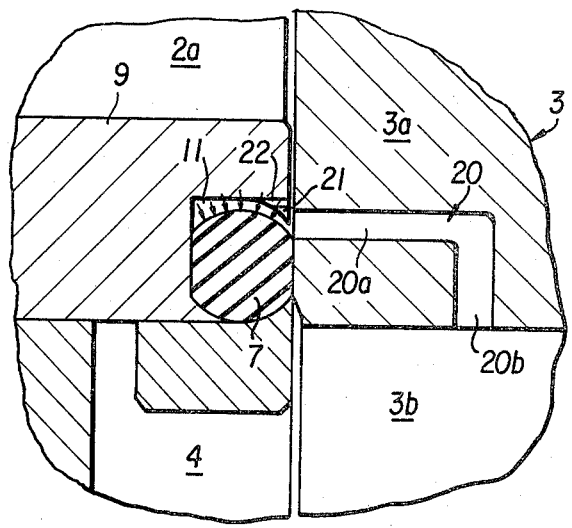
FIG. 6 is an enlarged cross sectional view of a portion of a gate valve according to a first embodiment of the present invention, which corresponds to the designated portion A of FIG. 1.
Figure 7:
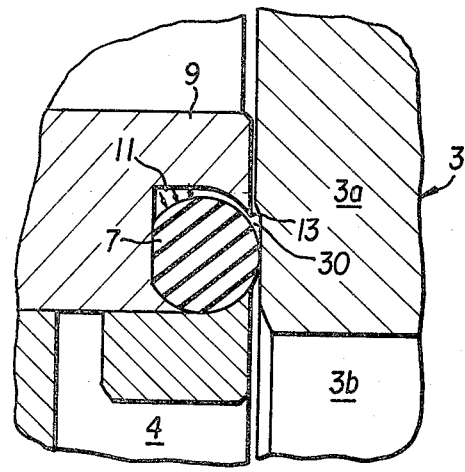
FIG. 7 is an enlarged cross sectional view of a portion of a gate valve according to a second embodiment of the invention, which portion corresponds to the designated portion A of FIG. 1.
Figure 8:
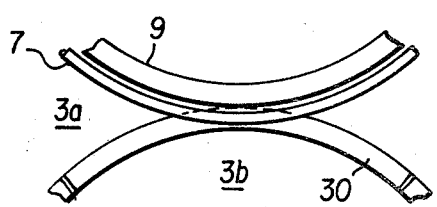
FIGS. 8 and 9 are explanatory views showing the positional relationship of a valve seat with a gate of the valve of FIG. 7, respectively.
Figure 9:
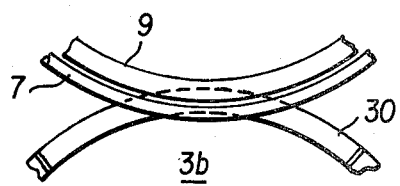

FIG. 6 shows a first embodiment, and FIGS. 7 through 9 show a second embodiment of the present invention. The valves in both embodiments are of the same type as the gate valve shown in FIG. 1.

Referring first to FIG. 6, a fluid communication hole 20 runs in blocking portion 3a of the gate in a direction of thickness of the gate. Fluid communication hole 20 has an inlet 20a open from the wall of blocking portion 3a on the upstream side and directly above the top end of opening portion 3b of the gate. An outlet 20b of fluid communication hole 20 is open to opening portion 3b of the gate, or, stated otherwise, open to the downstream side. Inlet 20a of fluid communication hole 20 takes the following positional relationship: The position of inlet 20a of the communication hole should be such that, as seen in FIG. 6, when gate 3 is shifted from the closed position to the open position, or stated otherwise, when the gate is lifted, the inlet of fluid communication hole 20 faces opening 13 in valve seat retainer 9, immediately before the initial stage of the upward motion by which the wall of the gate disengages from valve seat 7.

Thus, the fluid within groove 11 in the valve seat retainer which acts on valve seat 7 is directed by way of fluid communication hole 20 into opening portion 3b of the gate during the initial stage of the upward motion of the gate at which time gate 3 disengages from valve seat 7, thereby decreasing the pressure acting on valve seat 7. Consequently, when the opening portion 3b of the gate faces valve seat 7, the valve seat no longer projects into opening portion 3b of the gate.

In one edge portion 21 of opening 13 of the groove in the valve seat retainer, there may be provided a small communication hole 22, which runs from one end of the valve seat retainer to groove 11. In this case, inlet 20a of fluid communication hole 20 engages small communication hole 22 prior to reaching opening 13 as gate 3 is moved upward from the closed to the open position so that the fluid within groove 11 will escape by way of small communication hole 22 into fluid communication hole 20.

In the second embodiment of this invention, the wall on the upstream side of blocking portion 3a of the gate is cut in the form of an arc conforming to the arc of opening portion 3b of the gate to thereby form a stepped portion 30. Stepped portion 30 need not cover the entire periphery of opening portion 3b as it is only necessary to cover part of the upper portion of opening portion 3b. The position of the stepped portion should be such that during the initial stage of the upward motion of the gate, as the gate disengages from valve seat 7, stepped portion 30 engages the lower end of valve seat 7 as well as meets the opening of valve seat retainer 9, so that the fluid within groove 11 in the valve seat retainer will be drained by way of the gap between stepped portion 30 and valve seat 7 into the opening side of the gate.

Because of the annular arc shape of the stepped portion 30, some portion of valve seat 7 is maintained in contact therewith continuously from the stage at which the lower end of valve seat 7 begins to face stepped portion 30 (the conditions shown in FIGS. 7 and 8) until the lower end of valve seat 7 faces opening portion 3b of the gate (the condition shown in FIG. 9), so that the fluid within groove 11 will be continuously discharged along the wall of stepped portion 30 into the opening side of the gate. Consequently, the pressure of the fluid within the groove which acts on the valve seat 7 is decreased so as to prevent valve seat 7 from being forced out of the groove 11.

In the valve according to the present invention, a fluid passage, such as a fluid communication hole or a stepped portion, is provided in the gate itself, so that the fluid pressure acting on the valve seat is properly relieved, without the need to employ a valve seat made of a hard material or reducing the size of the opening of the valve seat retainer. In the valve according to the present invention, the valve seat provides the desirable sealing effect either in the case where the working fluid pressure is high or in the case where the working fluid pressure is low.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gate valve which comprises:
   a resilient seat which is circular in cross section;
   a retainer housing within which said resilient seat is disposed, said housing comprising a first member and a second member connected to said first member forming an open ended chamber therebetween wherein said first member includes an upper edge portion and said second member includes a lower edge portion, such that said upper and lower edge portions cooperate to retain said resilient seat;
   gate means cooperatively engageable with said resilient seat; and
   passage means formed in said gate means and in said first member for communicating fluid flowing from said chamber out of said passage means.

2. The valve device as set forth in claim 1 wherein said passage means comprises: said gate means with a fluid communication hole provided therein.

3. A gate valve which comprises:
   a resilient seat which is circular in cross section;
   a retainer housing within which said resilient seat is disposed;
   said housing comprising a first member and a second member connected to said first member forming an open ended chamber therebetween wherein said first member includes an upper edge portion and said second member includes a lower edge portion, such that said upper and lower edge portions cooperate to retain said resilient seat;
   gate means cooperatively engageable with said resilient seat and which includes an opening portion formed therein; and
   passage means formed in said gate means for communicating fluid flowing from said chamber out of said passage means to said opening portion wherein said passage means comprises said gate means with an annular, arcuate, fluid communication stepped wall portion provided therein.

4. A gate valve as set forth in claim 3 wherein said stepped wall portion is formed only along a portion of the periphery of said opening portion of said gate means.

* * * * *